United States Patent
Sreedharan

(10) Patent No.: US 8,949,191 B2
(45) Date of Patent: *Feb. 3, 2015

(54) USING VERSIONING TO BACK UP MULTIPLE VERSIONS OF A STORED OBJECT

(71) Applicant: EMC Corporation, Hopkinton, MA (US)

(72) Inventor: Sachhin Sreedharan, Bangalore (IN)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/688,068

(22) Filed: Nov. 28, 2012

(65) Prior Publication Data

US 2013/0191342 A1    Jul. 25, 2013

Related U.S. Application Data

(63) Continuation of application No. 13/358,859, filed on Jan. 26, 2012, now Pat. No. 8,370,311, which is a continuation of application No. 11/714,714, filed on Mar. 5, 2007, now Pat. No. 8,126,854.

(51) Int. Cl.
G06F 17/30    (2006.01)
G06F 11/14    (2006.01)

(52) U.S. Cl.
CPC ........ *G06F 11/1446* (2013.01); *G06F 11/1451* (2013.01); *Y10S 707/99954* (2013.01)
USPC ..... 707/654; 707/640; 707/644; 707/999.203

(58) Field of Classification Search
None
See application file for complete search history.

(56) References Cited

U.S. PATENT DOCUMENTS

2007/0136381 A1* 6/2007 Cannon et al. ............... 707/200

* cited by examiner

*Primary Examiner* — Anteneh Girma
(74) *Attorney, Agent, or Firm* — Van Pelt, Yi & James LLP

(57) ABSTRACT

Using a versioning feature of an authoring application to back up multiple versions of a stored object in single, version-enabled instance stored on backup media is disclosed. In some embodiments, an indication is received that a subsequent version data associated with an object an existing instance of which is stored in a backup storage location is to be backed up. A version control mechanism of an authoring application that created or updated the object as stored in a primary storage location is invoked to incorporate the subsequent version data into the existing instance of the object as stored in the backup storage location.

17 Claims, 10 Drawing Sheets

USING VERSIONING TO BACK UP MULTIPLE VERSIONS OF A STORED OBJECT

CROSS REFERENCE TO OTHER APPLICATIONS

This application is a continuation of co-pending U.S. patent application Ser. No. 13/358,859, entitled USING VERSIONING TO BACK UP MULTIPLE VERSIONS OF A STORED OBJECT filed Jan. 26, 2012 which is incorporated herein by reference for all purposes; which is a continuation of U.S. patent application Ser. No. 11/714,714, now U.S. Pat. No. 8,126,854, entitled USING VERSIONING TO BACK UP MULTIPLE VERSIONS OF A STORED OBJECT filed Mar. 5, 2007 which is incorporated herein by reference for all purposes.

BACKGROUND OF THE INVENTION

Traditionally, an incremental or differential backup by an object (e.g., file) based backup system and/or application has involved storing to backup media (e.g., a secondary disk) a backup copy of any object that has been newly created or modified since a last backup. Typically, every time an object is modified, the entire object is stored to backup media again. This leads to two copies of the same object on the backup media (e.g., tape or secondary disk), resulting in data redundancy. In addition, under the traditional approach, the backup software creates and maintains for every new version of an object that gets backed up an index entry and/or other metadata corresponding to the version. The presence on backup media of many version of the same object, each potentially stored in a different location, may also result in a long "recovery window", i.e., the time it takes to locate, retrieve, and restore a desired version, due to the fact that the appropriate tape/disk must be searched to retrieve the desired version.

Therefore, a solution is needed that provides faster and more reliable backup and restore while saving costly storage space by avoiding data redundancy.

BRIEF DESCRIPTION OF THE DRAWINGS

Various embodiments of the invention are disclosed in the following detailed description and the accompanying drawings.

DETAILED DESCRIPTION

Figure 1:
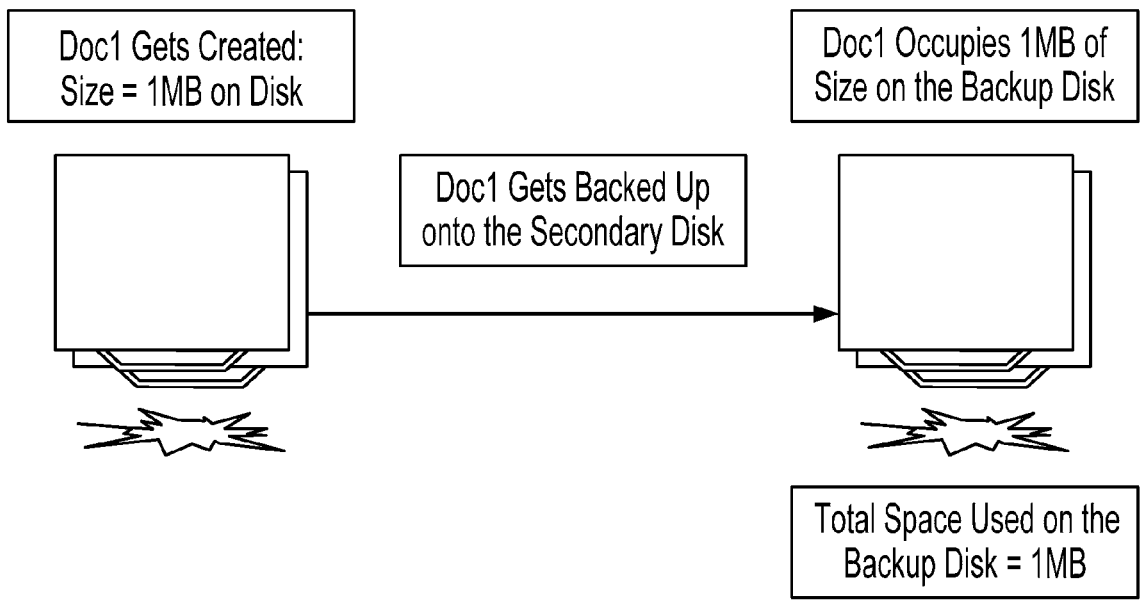
FIG. 1 shows the initial backup cycle, under a prior art approach, when an object gets created.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Performing a backup of objects created or updated by an application equipped with a version control mechanism is disclosed. An application that creates and/or updates stored objects is sometimes referred to herein as an "authoring application". The term "authoring application" is not limited to word processing applications and instead refers to any application that creates or updates stored objects, such as files or other file system objects. In various embodiments, a version control and/or tracking mechanism of the authoring application software is used to store in a backup location (e.g., a secondary server and/or disk) a single instance of an object stored on a production server or other primary storage location, in which single instance all backed up versions of the object are included, without requiring that the version control mechanism be used to include/track all such versions in the object as stored in the primary location. As used herein, the term "instance" refers to a copy of an object or the object itself, and may contain multiple versions of the object within itself.

In some embodiments, an object created or updated on a first or "production" server by an authoring application is exported to a specific folder. In some embodiments, the specific folder is on the first server. In some embodiments, the object is exported at least in part by invoking a version control mechanism of and/or an API or other interface exposed or otherwise implemented by the authoring application software. A backup software or other process is run, e.g., as per a scheduled program for backing up data. The object placed in the specific folder by the authoring application, which may be an original version that has not been backed up previously or an updated version of an object an original version of which was placed in the specific folder and/or backed up previously, is moved (for example, by a backup application or other process) to a specific folder on a second or backup server and/or disk. The version control mechanism of the application software that created or updated the object is used to import the object as placed in the specific folder of the second or backup server to a backup location on said second or backup server. If an instance of the object is not already present at the backup location, the application software creates a base instance of the object at said backup location on the second or backup server by exporting the original instance to the backup location. If an instance of the object is not already present at the backup location, the application software imports the object into the existing instance as a new version. In some embodiments, only the latest version of the object resides on the first or production server.

In some embodiments, a computer program product embodied in a computer readable medium comprises computer instructions to back up an object by leveraging a version control feature of the application software used to create or update said object in a manner so that the latest version of the object resides on a production server where it is created or updated and all the versions of the object including the original are included in a single instance of the object as stored at a backup location on a backup server.

In some embodiments, recovery of an object backed up as described herein is performed at least in part by browsing a list of objects available for recovery; retrieving an instance of an object of interest from the backup server; and selecting a version of interest from said retrieved instance of the object. In some embodiments, a backup software maintains an index comprising the names of objects for which it has performed backup and the application software maintains an index for all versions of the object within the instance of said object as present on the backup server.

In some embodiments, a retention policy is applied to backed up objects, so that older versions of objects beyond a retention period set by the policy are deleted automatically from the object as stored on backup media. In various embodiments, the retention period is set by default, user input, etc.

In a traditional backup scenario of the disk-to-disk-to-tape (D2D2T) type, in which a backup copy of an object is kept on a disk first and later is rolled onto a tape, the requirement to perform backup of set of objects is presently met by the following procedure:

The user first creates a set of objects on the production server. For purpose of explanation only, the objects are assumed to be MS word objects having names Doc1.doc and Doc2.doc, with object sizes of 1 MB each. Once the objects are created, the user closes the objects. The backup software which is configured to run at a specific time gets triggered and picks both of these objects and performs a backup of the same, e.g., to a secondary or backup disk. In this process, the backup software transfers 2 MB of data on the whole for both the said objects. FIG. 1 illustrates the initial backup cycle when Doc1 gets created, according to the traditional backup technique.

Figure 2:
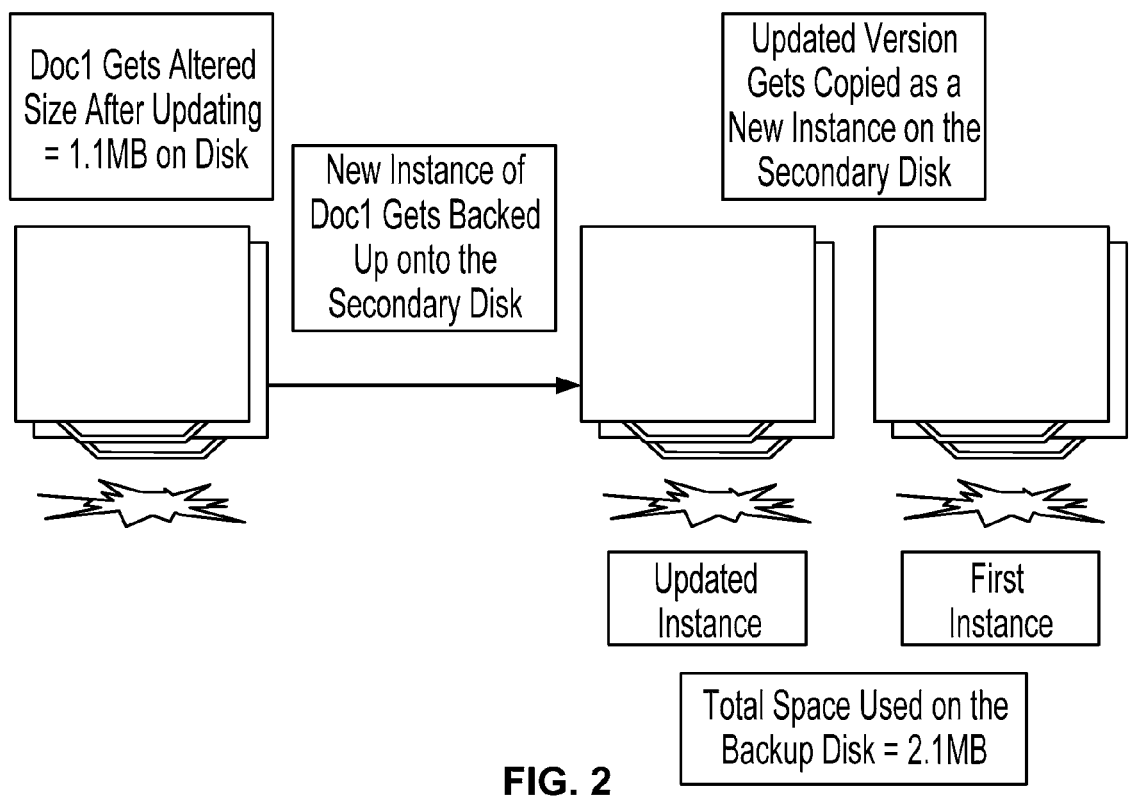
FIG. 2 shows the backup cycle, under a prior art approach, when a previously backed up object is updated.

On the second day, the user opens the object Doc1.doc, alters its contents and then saves the changes. The changes made to the object Doc1.doc may be assumed to be 100 Kb in size. The backup software, which is configured to perform an incremental backup, picks up the object Doc1.doc as soon as it detects that Doc1.doc has undergone a change, and performs a backup of the said object onto the backup disk. In this process, a total of 1.1 MB of data is transferred by the backup software and the updated version of the object is stored onto the backup disk. The backup destination (disk in this case) now contains two versions of the object Doc1.doc, one which has the latest updates and the other one which is the first instance. The total size of the object Doc1.doc on the backup destination (disk) is 2.1 Mb (1 MB of the first instance and 1.1 MB of the second version). FIG. 2 illustrates the backup cycle when Doc1 undergoes an update, according to the traditional backup technique. Similarly, for each subsequent backup period during which an update is performed on the objects Doc1.doc or Doc2.doc, a new complete copy of the object as updated will be stored to the backup disk.

Even though there is only 100 Kb or 0.1 Mb of data difference between the first and second versions of the object Doc1.doc in the example described above, the entire object is saved twice. This leads to approximately 1 MB of redundant data being stored with every backup instance of the object onto the backup device any time the object is modified (in case of addition of content to the object, as opposed to deletion or modification of previously existing content). Thus, with every instance of the object that gets backed up, under the traditional approach typically there is some redundant data that gets stored.

Saving space on backup storage by making the application software participate to a greater extent in the backup is disclosed. In some embodiments, the application software is adapted to maintain, within a single instance of an object as stored on backup media, different versions of the object (or maintain the history of the object changes), rather than the backup software maintaining multiple copies of the object.

When application software maintains versions of a given object within a single instance stored on backup media, the amount of disk space used to store data required to be able to restore the object to a version of interest is relatively very less when compared to storing each version as a separate copy of the object.

The Microsoft™ Word word processing application, for example, can be configured to create a new version of an object anytime a save operation is performed, whereby all versions of the object are contained within the same instance of the object. Being configured in such a way, for an object that has an initial size of 1 Mb and which has undergone a change of 100 kb, MS word stores both the versions of the said object within the same instance, and in that consumes a disk space of around 1.1 Mb. On the contrary, if there are two copies of the object maintained separately that contain updates independently, the total amount of disk space that is consumed to store both versions of the object is 2.1 MB (1 Mb for the base version, and 1.1 Mb for the version that has undergone modifications).

In some embodiments, only the latest version of an object resides on the primary disk/production server while a version control enabled copy resides on the secondary/backup disk. This helps in keeping the object size on the primary disk manageable as well as having the advantage of using the version control mechanism of the application software to store and keep track of the various versions of the object, instead of requiring the backup application to track the version information, e.g., in an index.

In some embodiments, a new object is first created by an authoring application in a location \\Primary on the primary disk/production server. An initial backup of the object is performed, resulting in an initial instance being saved to a backup disk or other storage media, e.g., to a location \\Secondary. When the object undergoes modification, the application software exports the changes to a shared location, e.g., \\Primary\share, on the primary disk/production server. In some embodiments, the changes are exported by storing in the shared location on the primary disk/production server a copy of the object as modified and/or corresponding version information or metadata. In some embodiments, the application software uses its own version control mechanism to export the changes. After the object has been exported to the shared location, \\Primary\share in this example, in some embodiments a backup application or other process moves the new version from the shared location on the primary disk/production server to a shared location on the secondary disk and/or server, e.g., \\Secondary\share. The backup application or other process then prompts the authoring application to import the object as a new version to the existing instance of the object present in an ultimate backup destination, e.g., \\Secondary. The import of the new version of the object leverages the version control feature of the authoring application to achieve efficient storage on backup media of the current and prior versions of the object while at the same time relieving the backup application of the responsibility for keeping track of the various versions and where each is stored.

In some embodiments, the backup application is also used to perform recover operations on request. In various embodiments, the backup application maintains an object level index, does not maintain an object level index, or can be configured, e.g., at the option of an administrator or other authorized user, to maintain or not maintain an object level index, as desired. In some embodiments, to perform a recover operation the authoring application is invoked, e.g., programmatically by the backup application or other recover process, to retrieve a desired object. In some embodiments, once an instance of an object to be restored has been retrieved from backup storage, the authoring application is invoked, e.g., programmatically by the backup application or other recover process, to identify and restore a desired version of an object, e.g., by saving to a primary storage location a recovered copy of the version of interest.

In some embodiments, the authoring application stores within a version-enabled object as stored in backup media version information for that object. The version information is maintained in some embodiments in the same manner as for versioning-enabled objects stored on the production server or other primary storage location. For example, Microsoft™ Word maintains the different versions of an object within a single instance of the object.

In various embodiments, the authoring application provides and/or is configured and/or modified to provide a mechanism to enforce a retention policy for the versions of an object that it creates. In some embodiments, an API or other interface is defined that enables a backup application or process to interact programmatically with the authoring application to configure the authoring application to enforce with respect to the respective versions within a multi-versioned object stored on backup media an applicable retention policy and/or period, e.g., to ensure that versions that are older than the applicable retention period are purged. In such embodiments, the backup application or process is relieved of the responsibility for tracking each version and its corresponding date of creation, and enforcing retention by deleting a version when it is no longer required and/or permitted to be retained. Instead, the retention mechanism of the authoring application is relied on to enforce proper retention.

In some embodiments, the authoring application is adapted to expose or otherwise implement an API or other interface that is used by the backup software to trigger programmatically import commands, such as a request that a new version that has been moved to a shared location on a backup (secondary) storage be incorporated as a new version into a corresponding existing base or versioned instance of the object as stored in the backup storage.

In some embodiments, a backup as described herein is performed in the context of a D2D2T backup scheme. An object (and/or subsequent versions thereof) is backed up initially to a secondary disk and is later moved onto tape.

In some embodiments, the primary disk holds only the latest version of the object and does not hold the history of versions. When modifications are made to the object, the object will continue to reside on the location \\Primary. However, a copy of the latest version of the object will reside on the location \\Primary\share until the backup software puts it onto \\Secondary\share. During the entire process, the object that is present under \\Primary will continue to exist. The export mechanism will only have a new version of the object in \\Primary\share. It does not remove or move the version present in \\Primary to \\Primary\share. The application software makes a copy of the object rather than performing a move. In some embodiments, multiple successive versions of an object may be present in the shared location \\Primary\share, for example if the same object has been modified and saved multiple times between successive scheduled backups. In some embodiments, version numbers and/or other metadata are used to ensure that successive versions are handled, e.g., imported as versions into an instance of the object as stored on backup media, in the correct order and/or manner.

Figure 3A:
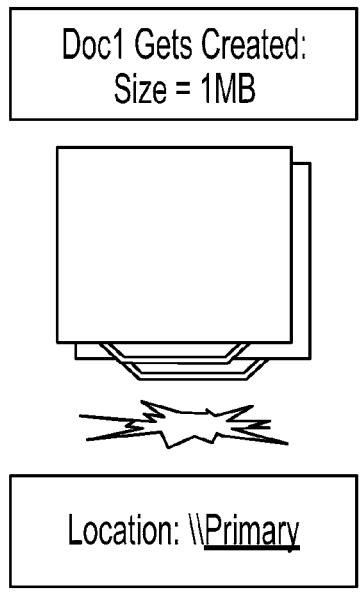
FIGS. 3a, 3b, 3c and 3d illustrate an embodiment of an initial backup of a newly created (i.e., not previously backed up) object.
Figure 3B:
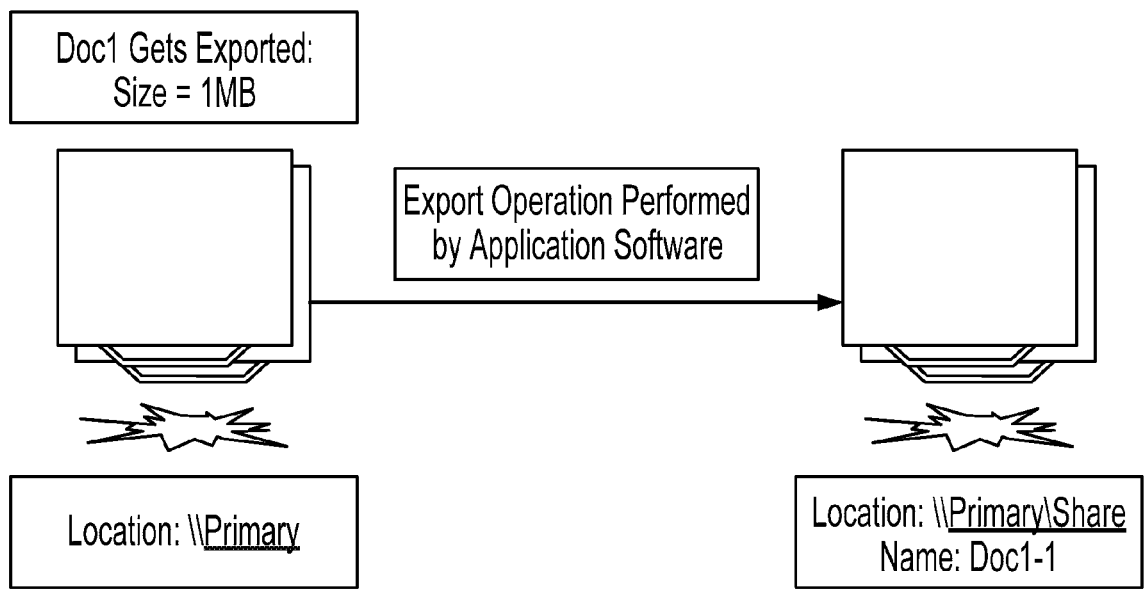
Figure 3C:
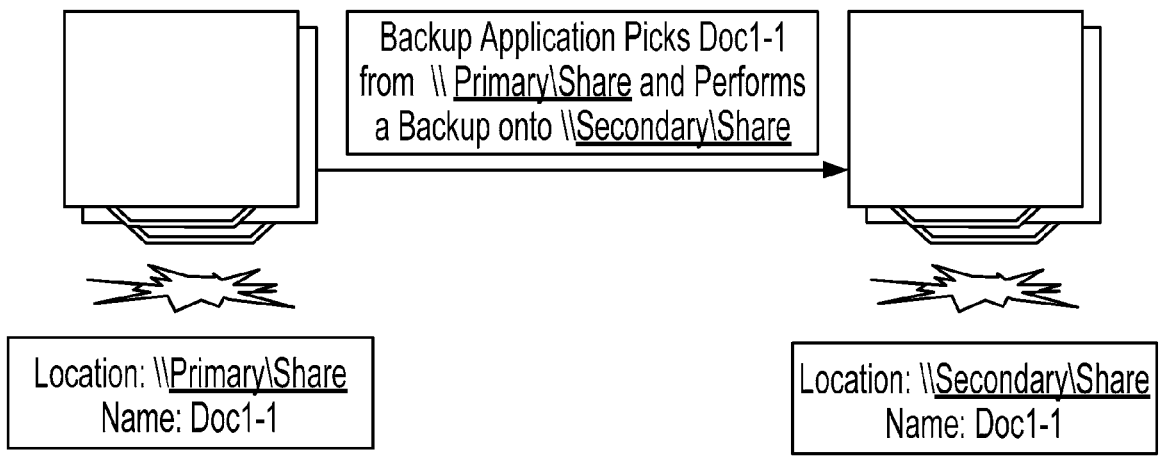
Figure 3D:
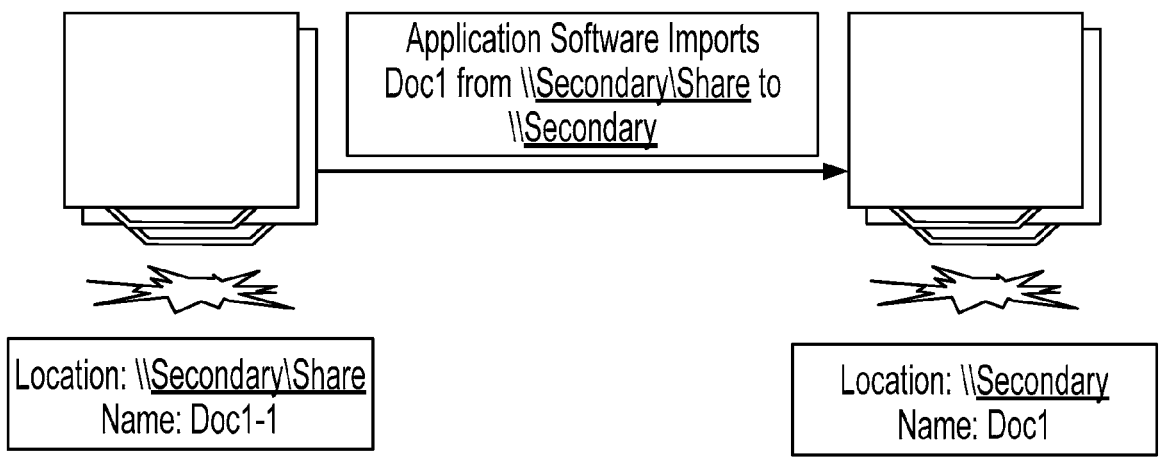
Figure 4:
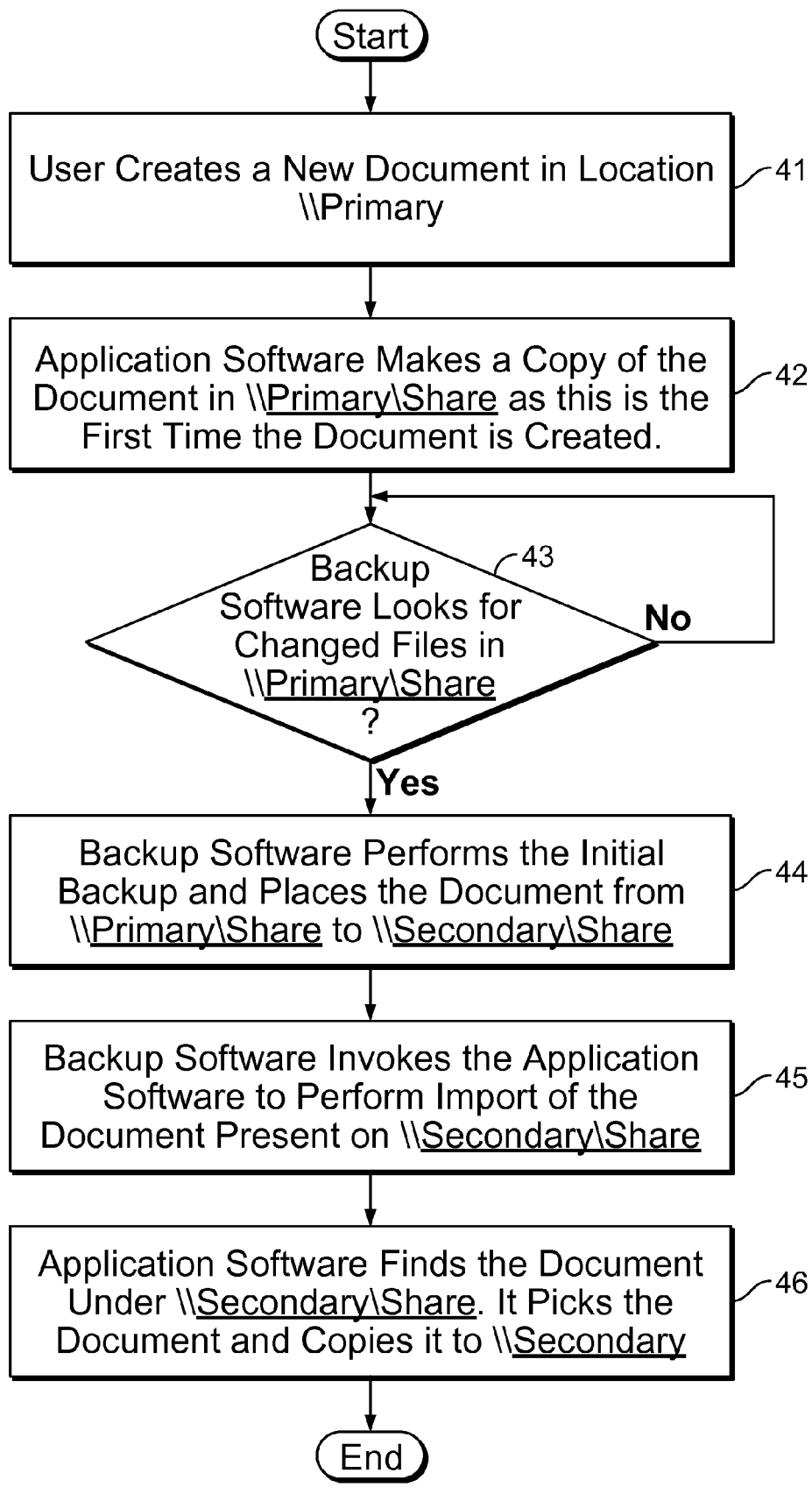
FIG. 4 shows a flow diagram of an embodiment of a process for performing an initial backup of a newly created (i.e., not previously backed up) object.

FIGS. 3a-3d and 4 illustrate an embodiment of a process for performing an initial backup when a new object is created, e.g., by and/or using an authoring application. In the example shown, a user invokes an authoring application to create a new object in the primary disk (FIGS. 3a and 41 in FIG. 4). The user performs operations on the object and then saves all the changes of the object. On invoking the save command, the authoring application exports the latest version of the object Doc1, in this case the newly created initial version, from the location \\Primary onto the folder \\Primary\share. In this case, the authoring application makes a copy of the object in \\Primary\share, as this is the first time the object is created (FIGS. 3b and 42 in FIG. 4). In some embodiments, the export performed at 42 of FIG. 4 comprises a copy of the latest version that contains the most recent changes. In the example shown, the authoring application stores the object Doc1 in the name of Doc1-1 in the \\Primary\share location. It also designates the version of the object that is present in location \\Primary with the number "1". The version number of the object is stored with the object as stored on \\Primary. In other words, when the user saves the changes to the object Doc1 on the disk \\Primary, the application software internally maintains the version number "1" inside the same instance of the object and then exports the object in the name of Doc1-1 to the location \\Primary\share. At this stage, there are two copies of the object that are currently available. The first one is present in \\Primary and the second one is present in \\Primary\share.

The backup software, which is scheduled to run for example at a specified time, is configured to look into the folder \\Primary\share for changed objects (FIGS. 3c and 43 in FIG. 4). In the example shown, the scheduled backup when run looks into \\Primary\share and finds Doc1-1 present therein. It then performs a backup of this object to the secondary disk. In the example shown, the backup software places the object Doc1-1 from \\Primary\share to \\Secondary\share (FIGS. 3c and 44 in FIG. 4).

After successful copy of Doc1-1 from \\Primary\share to \\Secondary\share, the backup software interfaces with the authoring application and requests that the authoring application import the object(s) (in this example object Doc1-1) present on \\Secondary\share (FIGS. 3d and 45 in FIG. 4). In some embodiments, the backup software uses an API or other interface that the authoring application exposes to interact programmatically with the authoring application to request the import operation. On receiving the request to import, the authoring application scans for all available objects present under \\Secondary\share. It finds the object (in this example object Doc1-1) present under location \\Secondary\share. The application software picks Doc1-1 from \\Secondary\share and searches for an instance of said object in \\Secondary. Since in this example the object is just created and is being backed up for the first time, the application software fails to find an instance of the object Doc1. Hence, it merely copies the object from \\Secondary\share onto the location \\Secondary (FIGS. 3d and 46 in FIG. 4) in the name of Doc1. In the example shown the authoring application removes the "-1" portion of the name of the object such that the object is stored at \\Secondary with its original name.

In some embodiments, the backup software that is scheduled to run for performing the backup from \\Secondary to tape eventually picks the instance of Doc1 and performs a backup onto tape.

The procedure described above comprises one single cycle of backup of objects which have been created. The resulting state of the system is that there is one object Doc1 which has been created on the disk \\Primary and which has a backup on the disk \\Secondary.

Figure 5A:
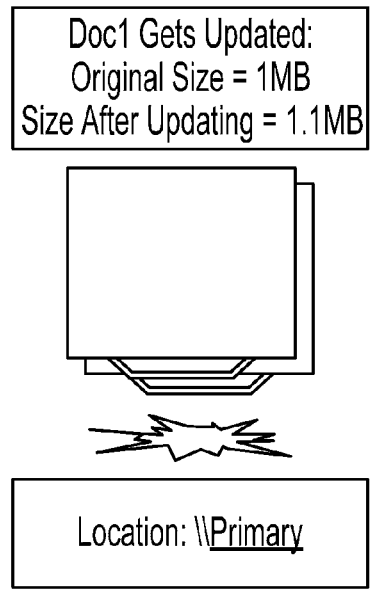
FIGS. 5a, 5b, 5c and 5d illustrate an embodiment of a process for performing a backup of a previously backed up object that has been updated.
Figure 5B:
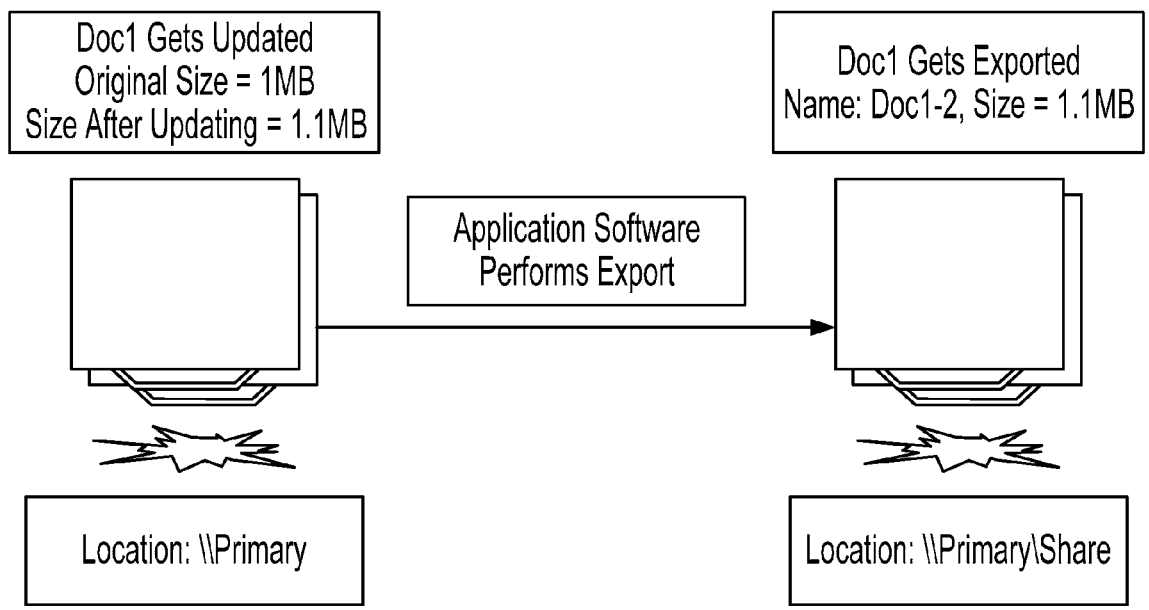
Figure 5C:
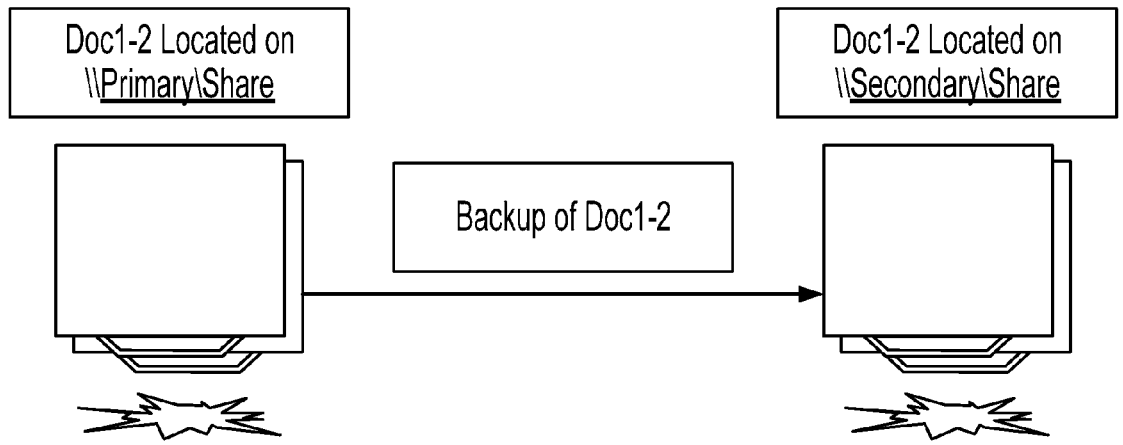
Figure 5D:
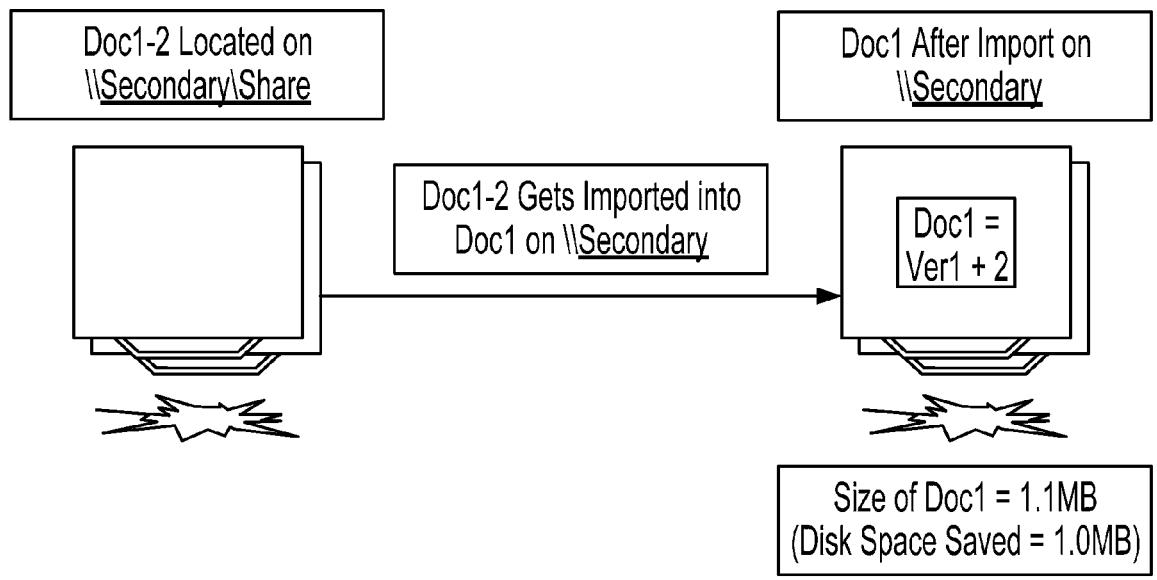
Figure 6A:
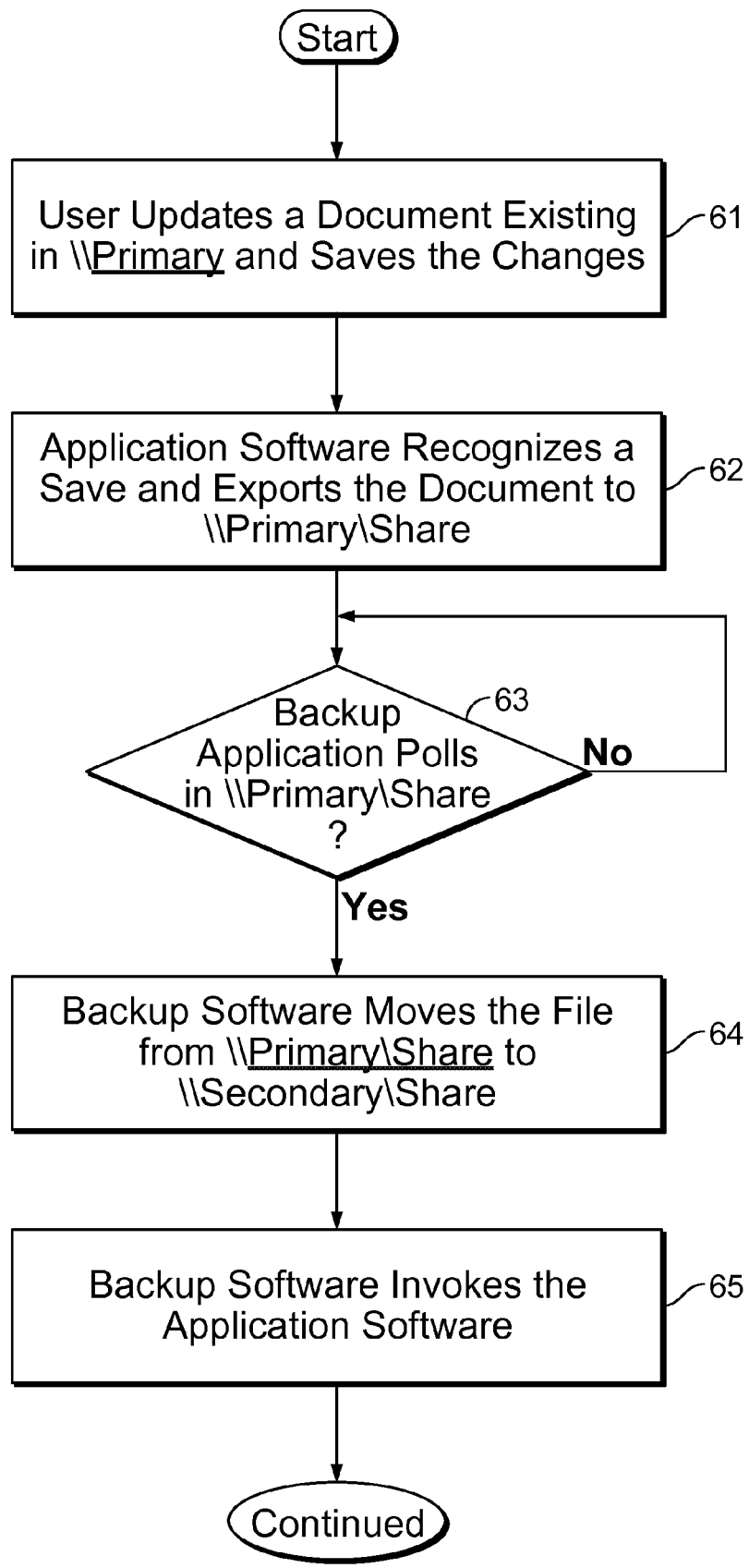
FIGS. 6a and 6b show a flow diagram of an embodiment of a process for performing a backup of a previously backed up object that has been updated.

FIGS. 5a-5d and 6a-6b illustrate an embodiment of a backup procedure for an update of an object an instance of which has already been stored on backup media. In the example shown, a user accesses the object Doc1 existing in the location \\Primary (that has been backed up once in this example), updates the object and then saves the changes in the object (FIGS. 5a and 61 in FIG. 6a). The size of the object after update is assumed as 1.1 Mb in this example. On receiving the save notification, the authoring application recognizes that an update has been made to the object Doc1 that resides in the location \\Primary and exports the object to \\Primary\share (FIGS. 5b and 62 in FIG. 6a). In performing the export, the application software first reads the existing version of the object that is maintained internally. It discovers the current version number of Doc1 to be "1". The application software alters this version number initially by incrementing the version number to "2", stores the new version number "2" within the object and then performs an export of the changes that has occurred to the object to the location \\Primary\share in the form of a new version having the name Doc1-2, as shown in FIG. 5b. The version number is set to "2" as it is the second version of the object Doc1 that has been saved since its creation. In some embodiments, the application software only performs an export of the changes in the object. It efficiently backs up new content and updated operational data. It does not delete the object from the location \\Primary.

The backup software, which in some embodiments runs at a scheduled time, looks into the folder \\Primary\share for new or changed objects (63 in FIG. 6a). On locating any object therein, the object is moved from \\Primary\share to the shared location, \\Secondary\share in this example, on the secondary/backup drive (FIGS. 5c and 64 in FIG. 6a). In this case, the backup software finds Doc1-2 in the folder \\Primary\share and copies it to the location\\Secondary\share. After a successful transfer of the objects from \\Primary\share to \\Secondary\share on completion of the backup, the backup software deletes the objects present on \\Primary\share.

The backup software, after moving the object(s) from \\Primary\share to \\Secondary\share, invokes the application software (65 in FIG. 6a). On receiving the notification from the backup software, e.g., through an API such as described above, to perform an import, the authoring application scans the location \\Secondary\share and finds the object Doc1-2.

Figure 6B:
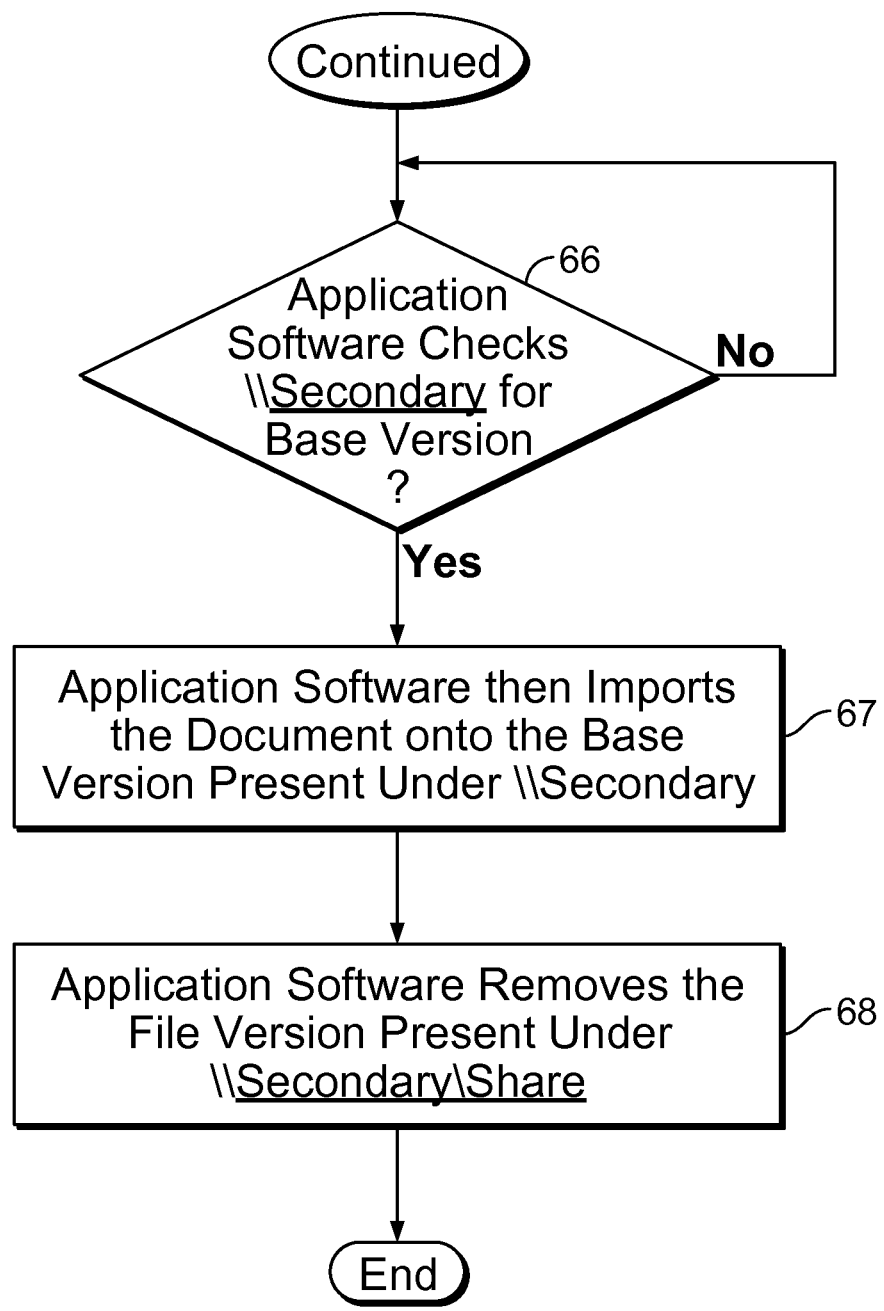

The application software checks the location \\Secondary for base version (66 in FIG. 6b). From the name of the object, the application software determines that an instance of Doc1 is present in the disk location \\Secondary. It then imports the object into the existing instance as a new version (FIGS. 5d and 67 in FIG. 6b). In some embodiments, the authoring application reads the current version number of the object (Doc1) which is present under \\Secondary, and finds that the version is "1". It increments the version number to "2" and then performs an import of the object Doc1-2 from \\Secondary\share onto the instance of Doc1 present in the disk \\Secondary, as shown in FIG. 5d. After successful import, in some embodiments the authoring application removes the object version (Doc1-2) that is present under the location \\Secondary\share (68 in FIG. 6b). The instance of the object Doc1 present in the disk \\Secondary now contains 2 versions. In some embodiments, objects that are present in the location \\Secondary that have had more than one version backed up maintain object versions within them.

The processes illustrated in FIGS. 3a-6b are repeated, in various embodiments, as new objects are created and/or existed objects updated and successive periodic or other backups are performed.

A typical prior art approach to restoring a specific version of an object from backup is to search among backups to locate the tape(s) on which data associated with a date associated with the desired version has been backed up, and then to locate the object within the tape(s). In some embodiments, by using the techniques described herein, the recover window is reduced due to the fact that the backup instance of the object which is maintained on the secondary disk has within it previous versions of the object that were created and saved. On a recover request, in some embodiments the entire object is recovered from disk with all previous versions in it. The user can choose from the object versions according to his needs. A desired version may be restored to the primary storage.

In some embodiments, the backup software will have reduced indexing requirements, as compared to traditional backups, when the techniques described herein are used. In some embodiments, the backup software only maintains an index or other record indicating which objects were backed up in a particular backup operation, e.g., one performed at a particular scheduled time. The traditional backup software maintains indexes for all objects backed up and also the details on the history/versions of each object. For example, if there exists a object Doc1 that has been updated three times in a span of three days (e.g., an update once a day), traditional backup software would maintain a record of the object and each backed up version, e.g., to enable a user to select which version of the object is required to be recovered. In some embodiments, the backup software does not maintain version data in its index and instead relies on the authoring application to store such information within the instance of an object as stored on backup media. In some embodiments, the user can select which version of the object he requires from within a user interface of the authoring application software itself, rather than having to go through the backup software.

Figure 7:
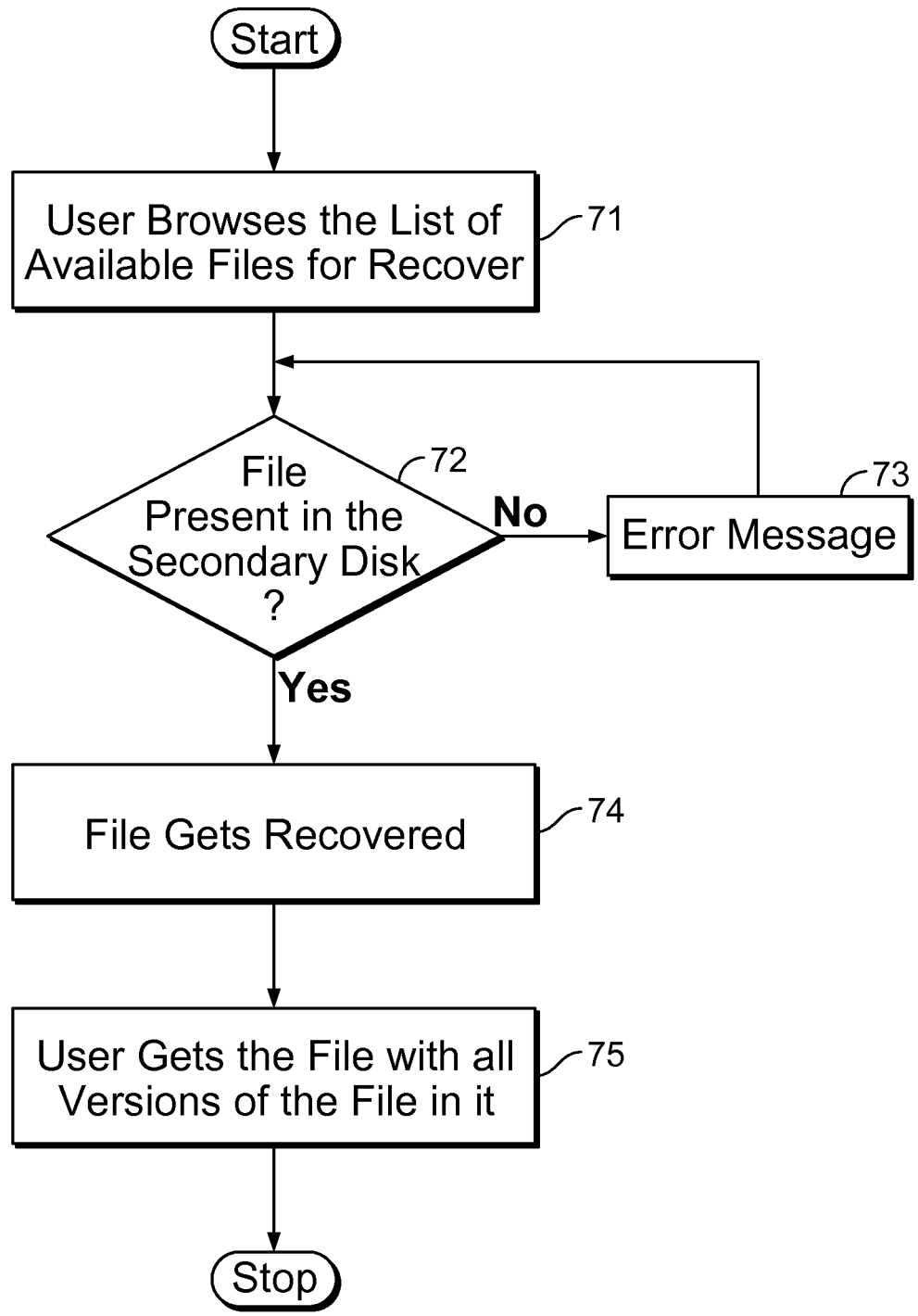
FIG. 7 shows a flow diagram illustrating an embodiment of a process for recovery of a desired version of an object.

FIG. 7 shows a flow diagram illustrating an embodiment of an operation to restore, using backup data, a desired version of an object. At 71, a user browses a list of objects which is available to be recovered and selects an object. At 72, it is determined whether the selected object is present in the \\Secondary disk. If so, the object is recovered (74) and provided to the user. The single instance of the object recovered at 74 in some embodiments contains all versions still under retention of the object (75). The user can select the version of the object he requires to recover. In some embodiments, the authoring application is used to determine and display to the user at 75 which versions are embodied in the instance of the object that was recovered at 74. In some embodiments, the authoring application is used to receive from the user at 75 a selection of a version to be restored and to store on the primary disk, e.g., in a restore location, an instance of the object that comprises just the version that the user has indicated the user desires to recover. Referring further to FIG. 7, if it is determined at 72 that an object selected at 71 is not present on the \\Secondary disk, an error message is presented to the user (73) indicating an error in the process.

In a typical case, use of the techniques described herein will result in a reduction in the recover time window, since it is only necessary to find and retrieve a single instance of the object, rather than sift through multiple separate instances (e.g., versions) each potentially stored in a different location.

In some embodiments, the objects that are stored on the disk \\Secondary are version control enabled, hence, they will tend to store the entire history of the object within themselves. In some embodiments, the history gets backed up every time the backup runs from the secondary disk to tape. The history and prior version data also uses disk space on the secondary disk. In some embodiments, retention policies are applied to version enabled objects as stored on backup media to ensure that versions created prior to a current retention period are not retained. In some embodiments, the authoring application is configured to delete from instances of objects as stored on the secondary disk versions that are older than a prescribed retention period. In some embodiments, the retention policy is configured at the authoring application software. In some embodiments, retention policies are determined by the application software at the time of creation of an object. In some embodiments, the retention policy is configured once on the authoring application software and it will be applied to all objects or data stores that get created once the policy is set. For example, the user may configure a retention policy on the application software to delete all versions of the object or data store that have been retained within the object that are older than 2 years from the date of creation of that version.

Figure 8:
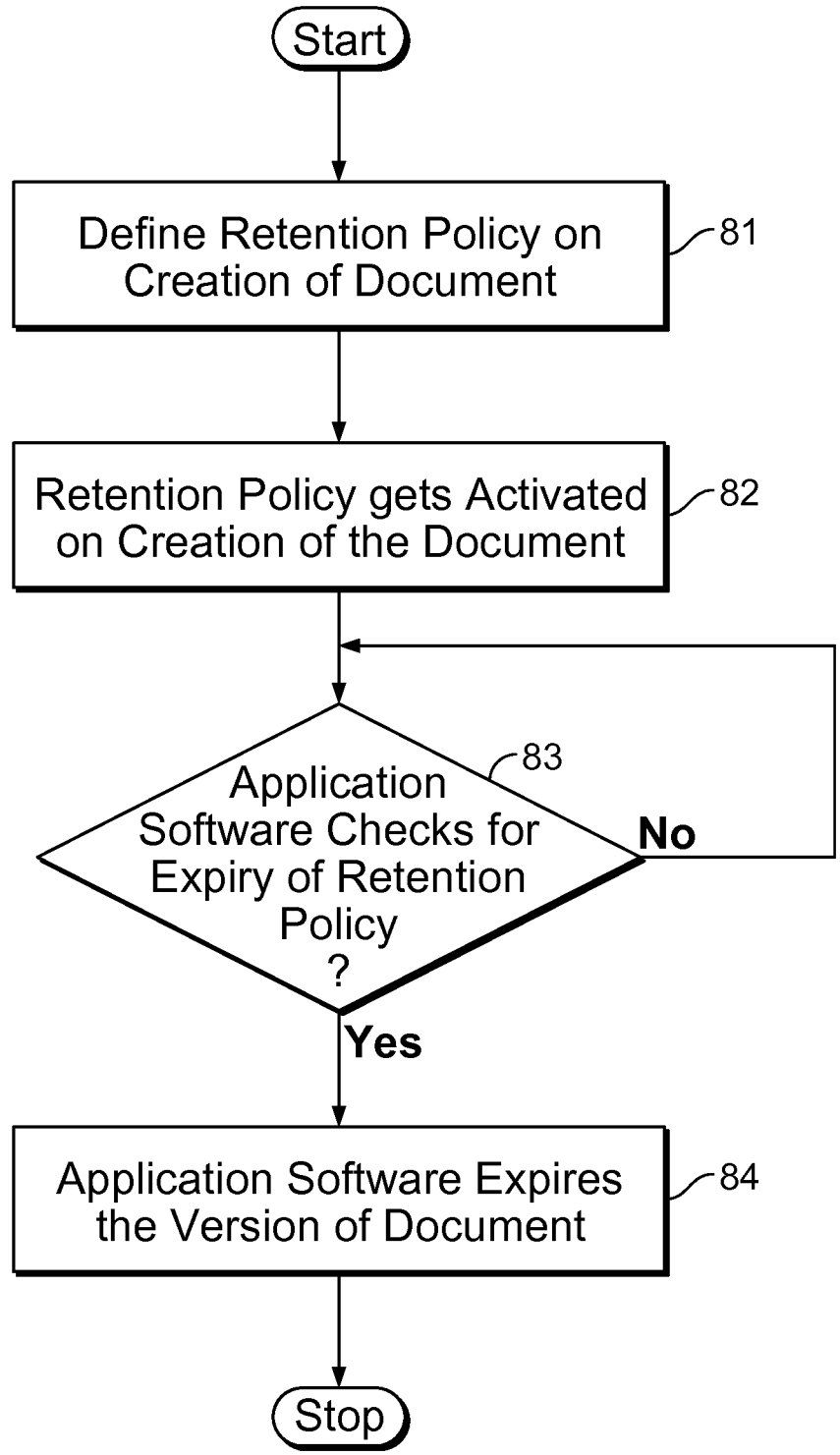
FIG. 8 shows a flow diagram illustrating an embodiment of a process for applying a retention policy.

FIG. 8 is a flow diagram depicting an embodiment of a process for applying a retention policy to version enabled instances of objects stored on backup media. At 81, an applicable retention policy is determined by the authoring application software at the time of creation of the object. The retention policy is enabled or gets activated on creation of any object (82). The application software continuously checks for the expiry of retention policy of versions of objects within an instance of the object as stored on backup media (83). Once the application software detects that a particular version of an object is no longer to be retained in the secondary disk according to the retention policy, it deletes that version from the instance of the object as stored on the secondary disk (84). In some embodiments, on the \\Secondary disk, the application is or may be configured to check, e.g., periodically, the objects as stored on the secondary disk and delete versions whose retention periods have expired. The space on the disk \\Secondary can be reduced in many cases if older and no longer relevant versions of objects are removed.

In some embodiments, if required at a later stage, a version of an object that has been removed from an instance of the object as stored on a secondary disk can be recovered using data backed up from the secondary disk to tape prior to the version being deleted from the instance as stored on the secondary disk.

In some embodiments, a default retention policy/period that an authoring application and/or backup software are configured to use by default can be altered by a user. Retention policies can be modified in some embodiments by the user configuring the retention policy, including the option to retain all versions of an object on the secondary disk (i.e., unlimited retention period). In such a case when different objects require different retention time periods, for example some objects contain important content that must be retained for long periods of time, the user will be able to retain for longer periods versions of such objects by having retention policies that are configured for longer periods of time or even have the option of maintaining the objects perpetually. Thus, protection of key data is ensured with policy-based management of information retention/deletion.

In some embodiments, checksum validation is used in connection with the techniques described herein. In some embodiments, the authoring application adds the checksum when it exports a changed version of an object to the \\Primary\share location. In some embodiments, the checksum is embedded within the object version itself. When the authoring application imports the new version of the object onto the base version present on \\Secondary, it validates the checksum against the value that is embedded within the version of the object. If the value that the application software generates during the import matches the one that is present in the version of the object, the import is considered to be successful.

Data compression techniques are applied in some embodiments. The compression technique can be best applied when the data gets exported into the \\Primary\share location. In this connection, the application software can first export the data onto a new version and then call a compression algorithm. This will ensure that the data that gets backed up will be in the compressed format leading to further reduction in the backup window. The data can be uncompressed to regular form on the secondary disk or the application software can maintain the data in the compressed format and then decide to uncompress it during the time of recovery.

While certain embodiments have been described taking objects that are generated using Microsoft™ Word as the authoring application, the techniques described herein are not limited to Microsoft™ Word and may be applied in connection with other authoring applications as well. The backup techniques described herein, for example, are applicable to any authoring application software and database store that implements version control for the data that it generates. The application software can be anything from databases to object generators.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for performing a backup of a stored object, comprising:
   receiving an indication that a subsequent version data associated with an object stored by an authoring application on a primary storage device is to be backed up to a backup storage location, wherein the subsequent version data includes modifications to the object and wherein an existing instance of the object is already stored at the backup storage location, as determined by the authoring application based at least in part on an object identifier associated with the object; and
   invoking, programmatically by a backup application via an interface of the authoring application, a version control mechanism of the authoring application that created or modified the object to incorporate the subsequent version data into the existing instance of the object as stored in the backup storage location, wherein the authoring application is configured to export subsequent version data by storing subsequent version data in a shared primary storage location on the primary storage device when a new version of a stored object is saved.

2. The method of claim 1, wherein the authoring application incorporates the subsequent version data into the existing instance of the object as stored in the backup storage location by importing the subsequent version data from a second shared storage location to the backup storage location.

3. The method of claim 1, wherein the backup storage location comprises a storage location on a secondary disk.

4. The method of claim 1, wherein the backup storage location comprises a storage location on a backup server.

5. The method of claim 1, wherein the backup application or another process is configured to maintain in an index an indication that the object has been backed up but not version information for the object.

6. The method of claim 1, wherein the authoring application is configured to use the existing instance as stored in the backup storage location to identify one or more versions available to be recovered.

7. The method of claim 6, wherein the authoring application is further configured to display to a user a displayed data indicating said one or more versions available to be recovered.

8. The method of claim 7, wherein the authoring application is further configured to receive a selection of a desired version to be recovered; and recover the desired version.

9. A computer system to perform a backup of a stored object, comprising:
a primary storage device; and
a processor configured to:
receive an indication that a subsequent version data associated with an object stored by an authoring application on a primary storage device is to be backed up to a backup storage location, wherein the subsequent version data includes modifications to the object and wherein an existing instance of the object is already stored at the backup storage location, as determined by the authoring application based at least in part on an object identifier associated with the object; and
invoke, programmatically by a backup application via an interface of the authoring application, a version control mechanism of the authoring application that created or modified the object to incorporate the subsequent version data into the existing instance of the object as stored in the backup storage location,
wherein the authoring application is configured to export subsequent version data by storing subsequent version data in a shared primary storage location on the primary storage device when a new version of a stored object is saved.

10. The system of claim 9, wherein the authoring application incorporates the subsequent version data into the existing instance of the object as stored in the backup storage location by importing the subsequent version data from a second shared storage location to the backup storage location.

11. The system of claim 9, wherein the backup storage location comprises a storage location on a secondary disk.

12. The system of claim 9, wherein the backup storage location comprises a storage location on a backup server.

13. The system of claim 9, wherein the backup application or another process is configured to maintain in an index an indication that the object has been backed up but not version information for the object.

14. The system of claim 9, wherein the authoring application is configured to use the existing instance as stored in the backup storage location to identify one or more versions available to be recovered.

15. A non-transitory computer readable storage medium, comprising computer instructions which when executed by a computer cause the computer to perform the steps of:
receiving an indication that a subsequent version data associated with an object stored by an authoring application on a primary storage device is to be backed up to a backup storage location, wherein the subsequent version data includes modifications to the object and wherein an existing instance of the object is already stored at the backup storage location, as determined by the authoring application based at least in part on an object identifier associated with the object; and
invoking, programmatically by a backup application via an interface of the authoring application, a version control mechanism of the authoring application that created or modified the object to incorporate the subsequent version data into the existing instance of the object as stored in the backup storage location,
wherein the authoring application is configured to export subsequent version data by storing subsequent version data in a shared primary storage location on the primary storage device when a new version of a stored object is saved.

16. The computer readable medium of claim 15, wherein the authoring application incorporates the subsequent version data into the existing instance of the object as stored in the backup storage location by importing the subsequent version data from a second shared storage location to the backup storage location.

17. The computer readable medium of claim 15, wherein the backup application or another process is configured to maintain in an index an indication that the object has been backed up but not version information for the object.

* * * * *